United States Patent
Flat et al.

(10) Patent No.: US 7,270,862 B2
(45) Date of Patent: Sep. 18, 2007

(54) POLYAMIDE AND POLYOLEFIN BLENDS WITH A POLYAMIDE MATRIX AND CONTAINING NANOFILLERS

(75) Inventors: Jean-Jacques Flat, Groupilleres (FR); Benoît Barriere, 'Le Tilleul Othon (FR); Benoît Brule, Bernay (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 11/301,153

(22) Filed: Dec. 12, 2005

(65) Prior Publication Data
US 2006/0100375 A1    May 11, 2006

Related U.S. Application Data

(62) Division of application No. 10/803,008, filed on Mar. 17, 2004, now Pat. No. 7,029,735.

(60) Provisional application No. 60/508,965, filed on Oct. 6, 2003.

(51) Int. Cl.
*C08L 77/00* (2006.01)
*C08K 3/34* (2006.01)

(52) U.S. Cl. .................. 428/35.7; 428/35.2; 524/445; 524/447; 524/449; 524/456; 524/514; 525/184; 525/183

(58) Field of Classification Search ........ 525/184, 525/183; 524/445, 447, 449, 456, 514; 428/35.2, 428/35.7
See application file for complete search history.

(56) References Cited

U.S. PATENT DOCUMENTS

| | | | |
|---|---|---|---|
| 6,403,231 B1 * | 6/2002 | Mueller et al. | 428/474.4 |
| 6,582,808 B2 * | 6/2003 | Castle et al. | 428/213 |
| 6,605,656 B2 * | 8/2003 | Ryntz et al. | 523/206 |

FOREIGN PATENT DOCUMENTS

JP    10-52899    * 2/1998

* cited by examiner

*Primary Examiner*—Ana Woodward
(74) *Attorney, Agent, or Firm*—Thomas F. Roland

(57) ABSTRACT

The present invention relates to polyamide (A) and polyolefin (B) blends containing nanofillers in which the polyamide forms the matrix. These blends can also be referred to as "polyamide (A), polyolefin (B) and nanofiller blends in which the polyamide forms the matrix". The invention also relates to structures with barrier properties comprising at least one layer of these blends and optionally at least one layer of another material. These structures are a barrier to numerous fluids, and in particular to oxygen, to styrene, to fumigation fluids, to pentane and to air conditioning fluids. These structures can be made into bottles, reservoirs, containers, pipes and vessels of all sorts. They can also be converted to films which are used to make packagings.

5 Claims, No Drawings

POLYAMIDE AND POLYOLEFIN BLENDS WITH A POLYAMIDE MATRIX AND CONTAINING NANOFILLERS

This application is a divisional of Ser. No. 10/803,008, filed Mar. 17, 2004, now U.S. 7,029,735, which claims priority from Provisional Application 60/508,965, filed Oct. 6, 2003.

FIELD OF THE INVENTION

The present invention relates to polyamide and polyolefin blends with a polyamide matrix and containing nanofillers. These blends are thermoplastic and can be converted to bottles, reservoirs, containers, pipes and vessels of all sorts. They can also be converted to films which are used to make packagings. The invention also relates to structures comprising at least one layer of these blends and at least one layer of another material. These structures can be converted to bottles, reservoirs, containers, pipes and vessels of all sorts. They can also be converted to films which are used to make packagings.

All these objects exhibit good barrier properties. The invention also relates to the use of these objects. For example, foods packaged in these packagings are protected from atmospheric oxygen and their degradation is avoided, whereas a polyethylene packaging allows some oxygen to pass through and the foods undergo degradation. The barrier properties can also be used in another sense. Thus, in the SMC (abreviation of Sheet Moulding Compound) technology, a composition based on crosslinkable unsaturated polyester and on styrene is disposed between two films and it is necessary for the styrene to remain in the composition and not to diffuse through the films. It is also possible to mention the barrier to pentane which is useful in packagings containing expandable polystryrene beads. Indeed, these beads contain pentane and it is necessary that the beads do not lose their pentane before their conversion to expanded polystyrene. It is also possible to mention pipes in which the cryogenic fluids for air conditioning circulate, such as for example HFAs and HFCs. In an air conditioning device, loss of fluid should be reduced both for economic reasons (these fluids are expensive) and for environmental protection reasons (an excessive leakage could damage the ozone layer). The structures of the invention are useful in these applications.

BACKGROUND OF THE INVENTION

SMC is used in the manufacture of converted articles not only in the automotive field (bumpers, tailgates, etc) but also in the marine (boat hulls) or electronics (casings) fields. SMC is generally composed of a crosslinkable polymeric resin, in particular an unsaturated polyester, reinforcing fillers such as glass fibres, and various other additives in minor quantities.

The SMC is ordinarily prepared by laying fibres on a layer of unsaturated polyester resin, which is itself supported on a moveable film, composed in general of polyethylene or of polyamide. Another film of the same kind is subsequently laid over the resin/reinforcing filler system in order to form a sandwich composite structure between two films. The sandwich subsequently passes through a series of kneading and compacting rollers and is generally wound up in the form of large rolls.

It is then stored before subsequent forming. During the storage period, the polyester resin undergoes partial crosslinking, which brings about an increase in the viscosity of the SMC, until it attains a consistency making it suitable for moulding. SMC users, generally moulders, cut an appropriately sized section from the roll, remove the support film by peeling and place the SMC in a heated mould for simultaneous forming and full cure. Thus composite compounds in the form of an SMC sandwich find ready application in compression moulding procedures.

The BMC (Bulk Moulding Compound) technology is similar except that the polyester to be crosslinked is either in a thick layer between two films or is in bulk in a drum packed with a film. The SMC and BMC compositions contain styrene.

Three properties relating to the sandwich film are of crucial importance for SMC manufacturers and users.

The first relates to the permeability of the peelable film to styrene. It is necessary for this peelable film to have a very low permeability to styrene in order to avoid the loss of monomeric styrene which plays the role of crosslinking agent in SMC. This loss of monomeric styrene is also damaging for the health of individuals and for the environment during operations for the manufacture of SMC and for its storage.

The second property relates to the ease of peeling of this film on the polyester structure, so that no residual film remains on the structure and to avoid the risks of tearing this film during operations of manufacture and forming of SMC.

Finally, the uptake of moisture and the water permeability of these peelable films should be very low so that the quality of the polyester resin, which is very sensitive to water, is not impaired during operations for the manufacture of SMC, the storage of the polyester or the forming of SMC.

The prior art described numerous mono- or multilayer films which have barrier properties and which can be used in the SMC technology, but also in other technologies such as fumigation. Patent EP 506515 describes films consisting of a polyamide and polyolefin blend for SMC. Patent EP 766913 describes the use of films consisting of a polyamide and polyolefin blend for fumigation. The fumigation of soils consists in treating the soils by injecting gas to a depth of about 0.5 or 1 m and then the soil to be treated is covered with a film so that the gas remains in the soil for longer, which makes it possible to reduce the quantities of gas to be used. Patent EP 990515 describes a film comprising a central polyolefin layer and two outer layers in the form of a polyamide/polyolefin alloy having a surface tension which is only slightly different from that of the polyolefin of the alloy. These films are useful in the SMC technology and in fumigation. Patent EP 997268 describes a mono- or multilayer film comprising metallocene polyethylene at least a first layer of a polyamide and polyethylene blend, optionally a second polyethylene layer in which the metallocene polyethylene is in the first and/or in the second layer. These films are useful in the SMC technology and in fumigation. None of these documents describes polyamide and polyolefin blends containing nanofillers or their barrier properties.

It has now been found that the introduction of nanofillers into polyamide and polyolefin blends led to a much higher increase in the barrier properties than if the nanofillers were introduced into the polyamide alone. In other words, if polyamide and polyolefin blends are compared with the same polyamide and polyolefin blends but containing nanofillers, the increase in the barrier properties is much greater than if a polyamide is compared with the same polyamide but containing nanofillers. Furthermore, the polyamide and polyolefin blends containing nanofillers are more efficient in real value as a barrier than the same polyamides containing nanofillers but containing no polyolefin (the proportion of nanofillers relative to the polyamide being the same). These very good barrier properties concern numerous technologies such as for example SMC, fumigation, expandable polystyrene packaging and air conditioning fluids. The property of a barrier to oxygen is useful in food packaging.

SUMMARY OF THE INVENTION

The present invention relates to polyamide (A) and polyolefin (B) blends containing nanofillers in which the polyamide forms the matrix. These blends can also be referred to as "polyamide (A), polyolefin (B) and nanofiller blends in which the polyamide forms the matrix".

The invention also relates to compositions with barrier properties which are polyamide (A) and polyolefin (B) blends containing nanofillers in which the polyamide forms the matrix.

The invention also relates to structures with barrier properties comprising at least one layer of these blends and optionally at least one layer of another material.

The invention also relates to the use of these structures for producing a barrier effect.

These structures are a barrier to numerous fluids, and in particular to oxygen, to styrene, to fumigation fluids, to pentane and to air conditioning fluids.

These structures can be made into bottles, reservoirs, containers, pipes and vessels of all sorts. They can also be converted to films which are used to make packagings. These films are also useful in food packaging, in SMC technology, in fumigation and in expandable polystyrene packaging. These pipes are useful in air conditioning devices.

The invention also relates to the use of these objects

DETAILED DESCRIPTION OF THE INVENTION

As far as the polyamide (A) and the polyolefin (B) blend containing nanofillers is concerned, the term polyamide refers to the condensation products:

of one or more amino acids, such as aminocaproic, 7-aminoheptanoic, 11-aminoundecanoic and 12-aminododecanoic acid, or of one or more lactams such as caprolactam, oenantholactam and lauryllactam;

of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic, terephthalic, adipic, azelaic, suberic, sebacic and dodecanedicarboxylic acid.

Examples of polyamides that may be mentioned include PA 6 and PA 6,6.

It is also possible to make advantageous use of copolyamides. Mention may be made of the copolyamides resulting from the condensation of at least two alpha,omega-amino carboxylic acids or of two lactams or of one lactam and one alpha,omega-amino carboxylic acid. Mention may also be made of the copolyamides resulting from the condensation of at least one alpha,omega-amino carboxylic acid (or one lactam), at least one diamine and at least one dicarboxylic acid.

Examples of lactams which may be mentioned include those having 3 to 12 carbon atoms on the main ring, which lactams may be substituted. Mention may be made for example, of β,β-dimethylpropiolactam, α,α-dimethylpropiolactam, amylolactam, caprolactam, capryllactam and lauryllactam.

Examples of alpha,omega-amino carboxylic acids that may be mentioned include aminoundecanoic acid and aminododecanoic acid. Examples of dicarboxylic acids that may be mentioned include adipic acid, sebacic acid, isophthalic acid, butanedioic acid, 1,4-cyclohexanedicarboxylic acid, terephthalic acid, the sodium or lithium salt of sulphoisophthalic acid, dimerized fatty acids (these dimerized fatty acids having a dimer content of at least 98% and preferably being hydrogenated) and dodecanedioic acid, $HOOC-(CH_2)_{10}-COOH$.

The diamine can be an aliphatic diamine having 6 to 12 carbon atoms; it may be of aryl and/or saturated cyclic type. Examples that may be mentioned include hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM).

Examples of copolyamides that may be mentioned include copolymers of caprolactam and lauryllactam (PA 6/12), copolymers of caprolactam, adipic acid and hexamethylenediamine (PA 6/6-6), copolymers of caprolactam, lauryllactam, adipic acid and hexamethylenediamine (PA 6/12/6-6), copolymers of caprolactam, lauryllactam, 11-aminoundecanoic acid, azelaic acid and hexamethylenediamine (PA 6/6-9/11/12), copolymers of caprolactam, lauryllactam, 11-aminoundecanoic acid, adipic acid and hexamethylenediamine (PA 6/6-6/11/12), and copolymers of lauryllactam, azelaic acid and hexamethylenediamine (PA 6-9/12).

Advantageously the copolyamide is chosen from PA 6/12 and PA 6/6,6.

It is possible to use polyamide blends. Advantageously, the relative viscosity of the polyamides, measured in solution at 1% in sulphuric acid at 20° C., is between 1.5 and 6.

There will be no departure from the framework of the invention on replacing part of the polyamide (A) with a polyamide block and polyether block copolymer, that is to say on using a mixture comprising at least one of the previous polyamides and at least one polyamide block and polyether block copolymer.

The polyamide block and polyether block copolymers result from the copolycondensation of polyamide sequences having reactive ends with polyether sequences having reactive ends, such as, inter alia:

1) Polyamide sequences having diamine chain ends with polyoxyalkylene sequences having dicarboxylic chain ends.

2) Polyamide sequences having dicarboxylic chain ends with polyoxyalkylene sequences having diamine chain ends obtained by cyanoethylation and hydrogenation of aliphatic dihydroxylated alpha-omega polyoxyalkylene sequences called polyether diols.

3) Polyamide sequences having dicarboxylic chain ends with polyether diols, the products obtained being, in this particular case, polyether-esteramides. These copolymers are advantageously used.

The polyamide sequences having dicarboxylic chain ends are obtained, for example, from the condensation of alpha-omega aminocarboxylic acids, lactams or dicarboxylic acids and diamines in the presence of a chain regulator dicarboxylic acid.

The polyether may be for example polyethylene glycol (PEG), a polypropylene glycol (PPG) or a polytetramethylene glycol (PTMG). The latter is also called polytetrahydrofuran (PTHF).

The number-average molar mass $\overline{Mn}$ of the polyamide sequences is between 300 and 15 000 and preferably between 600 and 5 000. The mass $\overline{Mn}$ of the polyether sequences is between 100 and 6 000, and preferably between 200 and 3 000.

The polyamide block and polyether block polymers may also comprise randomly distributed units. These polymers can be prepared by the simultaneous reaction of the polyether and the precursors of the polyamide blocks.

For example, it is possible to react polyether diol, a lactam (or an alpha-omega amino acid) and a chain regulator diacid in the presence of a small amount of water. A polymer is obtained which essentially has polyether blocks, polyamide blocks of widely varying length, but also the various reagents having randomly reacted which are randomly distributed along the polymer chain.

Whether these polyamide block and polyether block polymers are obtained from the copolycondensation of polyamide and polyether sequences prepared beforehand or from a single step reaction, have for example Shore D hardness which may be between 20 and 75, and advantageously between 30 and 70, and an inherent viscosity between 0.8 and 2.5, measured in metacresol at 250° C. for an initial concentration of 0.8 g/100 ml. The MFIs may be between 5 and 50 (235° C. under a load of 1 kg)

The polyether diol blocks are either used as they are and copolycondensed with polyamide blocks having carboxylic ends, or they are aminated so as to be converted to polyether diamines and condensed with polyamide blocks having carboxylic ends. They can also be blended with polyamide precursors and a chain regulator in order to make polyamide block and polyether block polymers having randomly distributed units.

Polyamide and polyether block polymers are described in patents U.S. Pat. Nos. 4,331,786, 4,115,475, 4,195,015, 4,839,441, 4,864,014, 4,230,838, and 4,332,920.

The ratio of the quantity of polyamide block and polyether block copolymer to the quantity of polyamide is, by weight, advantageously between 10/90 and 60/40. Mention may be made, for example, of the blends of PTMG block copolymer and blends of (i) PA 6 and (ii) PA 12 block and PTMG block copolymer.

PA 6, PA 6-6 and PA 6/6-6 are advantageously used.

Regarding the polyolefin (B) of the polyamide (A)/polyolefin (B) blend it may be functionalized or unfunctionalized or may be a blend of at least one functionalized polyolefin and/or at least one unfunctionalized polyolefin. For simplification, functionalized polyolefins have been described (B1) and unfunctionalized polyolefins (B2) below.

An unfunctionalized polyolefin (B2) is conventionally a homopolymer or copolymer of alpha-olefins or diolefins, such as, for example, ethylene, propylene, 1-butene, 1-octene and butadiene. By way of example, mention may be made of:

the homopolymers and copolymers of polyethylene, in particular LDPE, HDPE, LLDPE (linear low density polyethylene), VLDPE (very low density polyethylene) and metallocene polyethylene.

the homopolymers or copolymers of propylene.

ethylene-alpha-olefin copolymers such as ethylene-propylene, EPRs (ethylene-propylene rubbers) and ethylene-propylene-diene monomer copolymers (EPDMs).

styrene/ethylene-butene/styrene (SEBS), styrene/butadiene/styrene (SBS), styrene/isoprene/styrene (SIS) and styrene/ethylene-propylene/styrene (SEPS) block copolymers.

the copolymers of ethylene with at least one product selected from the salts and esters of unsaturated carboxylic acids, such as alkyl (meth)acrylate (for example methyl acrylate), or vinyl esters of saturated carboxylic acids, such as ethylene vinyl acetate (EVA), it being possible for the proportion of comonomer to be up to 40% by weight.

The functionalized polyolefin (B1) can be a polymer of alpha-olefins having reactive units (the functionalities); reactive units of this kind are acid, anhydride or epoxy functions. By way of example mention may be made of the above polyolefins (B2) grafted or co- or terpolymerized with unsaturated epoxides such as glycidyl (meth)acrylate, or with carboxylic acids or the corresponding salts or esters, such as (meth)acrylic acid (which can be fully or partly neutralized by metals such as Zn, etc.) or else with anhydrides of carboxylic acids, such as maleic anhydride. A functionalized polyolefin is, for example, a PE/EPR blend whose ratio by weight can vary within wide limits, for example between 40/60 and 90/10, the said blend being cografted with an anhydride, especially maleic anhydride, in accordance with a degree of grafting of, for example, from 0.01 to 5% by weight.

The functionalized polyolefin (B1) may be selected from the following (co)polymers, grafted with maleic anhydride or glycidyl methacrylate, in which the degree of grafting is, for example, from 0.01 to 5% by weight:

PE, PP, copolymers of ethylene with propylene, butene, hexene or octene containing for example from 35 to 80% by weight of ethylene;

ethylene-alpha-olefin copolymers such as ethylene-propylene, EPRs (ethylene-propylene rubbers) and ethylene-propylene-diene monomer copolymers (EPDMs).

styrene/ethylene-butene/styrene (SEBS), styrene/butadiene/styrene (SBS), styrene/isoprene/styrene (SIS) and styrene/ethylene-propylene/styrene (SEPS) block copolymers.

ethylene-vinyl acetate (EVA) copolymers containing up to 40% by weight of vinyl acetate;

ethylene-alkyl (meth)acrylate copolymers containing up to 40% by weight of alkyl (meth)acrylate;

ethylene-vinyl acetate (EVA) and alkyl (meth)acrylate copolymers, containing up to 40% by weight of comonomers.

The functionalized polyolefin (B1) can also be selected from ethylene-propylene copolymers containing a major proportion of propylene which are grafted with maleic anhydride and then condensed with monoamino polyamide (or a polyamide oligomer) (products described in EP-A-0342066).

The functionalized polyolefin (B1) may also be a copolymer or terpolymer of at least one of the following units: (1) ethylene, (2) alkyl (meth)acrylate or vinyl ester of saturated carboxylic acid and (3) anhydride such as maleic anhydride or (meth)acrylic acid or epoxy such as glycidyl (meth)acrylate.

By way of example of functionalized polyolefins of this last type, mention may be made of the following copolymers, in which the ethylene represents preferably at least 60% by weight and in which the termonomer (the function) represents, for example, from 0.1 to 10% by weight of the copolymer:

ethylene-alkyl (meth)acrylate-(meth)acrylic acid or maleic anhydride or glycidyl methacrylate copolymers;

ethylene-vinyl acetate-maleic anhydride or glycidyl methacrylate copolymers;

ethylene-vinyl acetate or alkyl (meth)acrylate-(meth) acrylic acid or maleic anhydride or glycidyl methacrylate copolymers.

In the above copolymers, the (meth)acrylic acid can be in the form of a salt with Zn or Li.

The terms "alkyl (meth)acrylate" in (B1) or (B2) denotes C1 to C8 alkyl acrylates and methacrylates and may be selected from methyl acrylate, ethyl acrylate, n-butyl acrylate, isobutyl acrylate, 2-ethylhexyl acrylate, cyclohexyl acrylate, methyl methacrylate and ethyl methacrylate.

Furthermore, the abovementioned polyolefins (B1) may also be crosslinked by any appropriate process or agent (diepoxy, diacid, peroxide, etc.); the term "functionalized polyolefin" also embraces the blends of the abovementioned polyolefins with a difunctional reagent such as diacid, dianhydride, diepoxy, etc. which is capable of reacting with the said polyolefins, or the blends of at least two functionalized polyolefins which are capable of reacting with themselves.

The abovementioned copolymers, (B1) and (B2), may be copolymerized randomly or blockwise and may have a linear or branched structure.

The molecular weight, MFI and density of these polyolefins may also vary within a wide range, as the person skilled in the art will appreciate. MFI, the abbreviation for melt flow index, is the index of fluidity in the melt state. It is measured in accordance with the standard ASTM 1238.

The unfunctionalized polyolefins (B2) are advantageously selected from homopolymers or copolymers of propylene and any homopolymer of ethylene or copolymer of ethylene and a higher alpha-olefin-type comonomer such as butene, hexene, octene or 4-methyl-1-pentene. Mention may be made, for example, of PPs, high density PEs, medium density PE, linear low density PE, low density PE and very low density PE. These polyethylenes are known by the person skilled in the art as being products of a radical process, products of Ziegler catalysis or, more recently, products of metallocene catalysis.

The functionalized polyolefins (B1) are advantageously selected from any polymer containing alpha-olefin units and units which carry polar reactive functions, such as epoxy, carboxylic acid or carboxylic anhydride functions. Examples of such polymers that may be mentioned include the terpolymers of ethylene, alkyl acrylate and maleic anhydride or glycidyl methacrylate, such as the Applicant's Lotader® products, or polyolefins crafted with maleic anhydride, such as the Applicant's Orevac® products, and also terpolymers of ethylene, alkyl acrylate and (meth)acrylic acid. Mention may also be made of the homopolymers or copolymers of polypropylene which are grafted with a carboxylic anhydride and then condensed with polyamides or monoamino polyamide oligomers.

The MFI of (A), and the MFIs of (B1) and (B2), can be selected within a wide range; however, in order to facilitate the dispersion of (B) it is recommended that the viscosities of (A) and (B) be little different.

For small proportions of (B), for example from 10 to 15 parts, it is sufficient to use an unfunctionalized polyolefin (B2). The proportion of (B2) and (B1) in the (B) phase depends on the amount of functions present in (B1) and on their reactivity. It is advantageous to use (B1)/(B2) weight ratios ranging from 5/35 to 15/25. It is also possible to use only a mixture of polyolefins (B1) in order to obtain crosslinking.

The polyamide (A) and polyolefin (B) blend containing the nanofillers is polyamide matrix-based. Usually, it is sufficient for the proportion of polyamide in the polyamide (A) and polyolefin (B) blend containing the carbon nanotubes to be at least 40% by weight, and preferably between 40 and 75%, and even better between 50 and 75% for there to be a polyamide matrix. That is the case for the first three preferred embodiments of the polyamide and polyolefin blend. In the fourth preferred embodiment, the polyolefin phase is crosslinked, which ensures that there is no phase inversion and that there is still a polyamide matrix.

In accordance with a first preferred embodiment of the invention, the polyolefin (B) comprises (i) a high-density polyethylene (HDPE) and (ii) a polyethylene (C1) and a polymer (C2) blend chosen from elastomers, very low-density polyethylenes and ethylene copolymers, the (C1)+(C2) blend being cografted with an unsaturated carboxylic acid or an unsaturated carboxylic anhydride.

According to a variant of this first embodiment of the invention, the polyolefin (B) comprises (i) a high-density polyethylene (HDPE), (ii) a polymer (C2) chosen from elastomers, very low-density polyethylenes and the ethylene copolymers (C2) being grafted with an unsaturated carboxylic acid or an unsaturated carboxylic acid anhydride and (iii) a polymer (C'2) chosen from elastomers, very low-density polyethylenes and ethylene copolymers.

In accordance with a second preferred embodiment of the invention, the polyolefin (B) comprises (i) polypropylene and (ii) a polyolefin which results from the reaction of a polyamide (C4) with a copolymer (C3) comprising propylene and a grafted or copolymerized, unsaturated monomer X.

In accordance with a third preferred embodiment of the invention, the polyolefin (B) comprises (i) a polyethylene of the EVA, LLDPE, VLDPE or metallocene type and (ii) an ethylene-alkyl (meth)acrylate-maleic anhydride copolymer.

In accordance with a fourth preferred embodiment of the invention, the polyolefin comprises two functionalized polymers comprising at least 50 mol % of ethylene units and capable of reacting to form a crosslinked phase. According to one variant, the polyamide (A) is chosen from the (i) polyamide and (ii) PA 6 block and PTMG block copolymer blends and the (i) polyamide and (ii) PA 12 block and PTMG block copolymer blends; the ratio of the quantities of copolymer and polyamide by weight being between 10/90 and 60/40.

As far as the first embodiment is concerned, the proportions are advantageously the following (by weight):

60 to 70% of polyamide, 5 to 15% of the cografted (C1) and (C2) blend the remainder as high-density polyethylene.

As far as the high-density polyethylene is concerned, its density is advantageously between 0.940 and 0.965 and the MFI between 0.1 and 5 g/10 min. (190° C. 2.16 kg).

The polyethylene (C1) may be chosen from the polyethylenes mentioned above. Advantageously, (C1) is a high-density polyethylene (HDPE) having a density between 0.940 and 0.965. The MFI of (C1) is (under 2.16 kg-190° C.) between 0.1 and 3 g/10 min.

The copolymer (C2) may be for example an ethylene/propylene (EPR) or ethylene/propylene/diene (EPDM) elastomer. (C2) may also be a very low density polyethylene (VLDPE) which is either an ethylene homopolymer, or an ethylene and an alpha-olefin copolymer. (C2) may also be a copolylmer of ethylene with at least one product chosen from (i) unsaturated carboxylic acids, their salts, their esters, (ii) vinyl esters of saturated carboxylic acids (iii) unsaturated dicarboxylic acids, their salts, their esters, their hemiesters, their anhydrides. Advantageously, (C2) is an EPR.

Advantageously, 60 to 95 parts of (C1) per 40 to 5 parts of (C2) are used.

The (C1) and (C2) blend is grafted with an unsaturated carboxylic acid, that is to say (C1) and (C2) are cografted. There will be no departure from the framework of the invention on using a functional derivative of this acid. Examples of unsaturated carboxylic acid are those having 2 to 20 carbon atoms such as acrylic, methacrylic, maleic, fumaric and itaconic acids. The functional derivatives of these acids comprise for example the anhydrides, the ester derivatives, the amide derivatives, the imide derivatives and the metal salts (such as the alkali metal salts) of the unsaturated carboxylic acids.

Unsaturated dicarboxylic acids having 4 to 10 carbon atoms and their functional derivatives, particularly their anhydrides, are particularly preferred grafting monomers. These grafting monomers comprise for example maleic, fumaric, itaconic, citraconic, allylsuccinic, cyclohex-4-ene-1,2-dicarboxylic, 4-methyl-cyclohex-4-ene-1,2-dicarboxylic, bicyclo(2.2.1)-hept-5-ene-2,3-dicarboxylic, x-methylbicyclo(2.2.1)-hept-5-ene-2,3-dicarboxylic acids, maleic, itaconic, citraconic, allylsuccinic, cyclohex-4-ene-1,2-dicarboxylic, 4-methylenecyclohex-4-ene-1,2-dicarboxylic, bicyclo(2.2.1)hept-5-ene-2,3-dicarboxylic, and x-methylbicyclo(2.2.1)hept-5-ene-2,2-dicarboxylic anhydrides. Maleic anhydride is advantageously used.

Various known methods can be used to graft a grafting monomer onto the (C1) and (C2) blend. For example, this may be carried out by heating the (C1) and (C2) polymers at high temperatures, about 150° to about 300° C., in the presence or in the absence of a solvent with or without a generator of radicals.

In the (C1) and (C2) blend modified by grafting, which is obtained as mentioned above, the quantity of grafting monomer may be chosen in an appropriate manner, but it is preferably from 0.01 to 10%, even better from 600 ppm to 2% relative to the weight of (C1) and (C2) grafted. The quantity of monomer grafted is determined by assaying the succinic functions by FTIR spectroscopy. The MFI of (C1) and (C2) having been cografted is from 5 to 30 g/10 min. (190° C.-2.16 kg), preferably 13 to 20.

Advantageously, the cografted (C1) and (C2) blend is such that the $MFI_{10}/MFI_2$ ratio is greater than 18.5, $MFI_{10}$ designating the flow index at 190° C. under a load of 10 kg, and $MFI_2$ the index under a load of 2.16 kg. Advantageously, the $MFI_{20}$ of the blend of the cografted (C1) and (C2) polymers is less than 24. $MFI_{20}$ designates the flow index at 190° C. under a load of 21.6 kg.

As far as the variant of the first embodiment is concerned, the proportions are advantageously the following (by weight):

60 to 70% of polyamide,
5 to 10% of grafted (C2),
5 to 10% of (C'2)
the remainder as high-density polyethylene.

(C2) is advantageously an EPR or an EPDM, (C'2) is advantageously an EPR containing, by weight, 70 to 75% of ethylene.

As far as the second embodiment of the invention is concerned, the proportions are advantageously the following (by weight):

60 to 70% of polyamide,
20 to 30% of polypropylene 3 to 10% of a polyolefin which results from the reaction of a polyamide (C4) with a copolymer (C3) comprising propylene and a grafted or copolymerized, unsaturated monomer X.

The MFI of the polypropylene is advantageously less than 0.5 g/10 min (230° C.-2.16 kg) and preferably between 0.1 and 0.5. Such products are described in EP 64781.

A description will now be given of the grafted product of this second embodiment of the invention. First of all, (C3) is prepared, which is either a copolymer of propylene and all unsaturated monomer X or a polypropylene onto which an unsaturated monomer X is grafted. X is any unsaturated monomer which can be copolymerized with propylene or grafted onto polypropylene and possesses a function which is able to react with a polyamide. This function may be, for example, a carboxylic acid, a dicarboxylic anhydride or an epoxide. Examples of monomers X that may be mentioned include (meth)acrylic acid, maleic anhydride and unsaturated epoxides such as glycidyl (meth)acrylate. It is advantageous to use maleic anhydride. As regards grafted polypropylenes, X can be grafted onto polypropylene homopolymers or copolymers, such as ethylene-propylene copolymers containing a major proportion of propylene (in moles). Advantageously, (C3) is such that X is grafted. Grafting is an operation which is known per se.

(C4) is a polyamide or a polyamide oligomer. Polyamide oligomers are described in EP 342066 and FR 2291225. The polyamides (or oligomers) (C4) are condensation products of monomers already mentioned above. Mixtures of polyamides may be used. It is advantageous to use PA 6, PA 11, PA 12, the copolyamide having 6-units and 12-units (PA 6/12), and the copolyamide based on caprolactam, hexamethylenediamine and adipic acid (PA 6/6-6). The polyamides or oligomers (C4) may have acid, amine or monoamine end groups. For the polyamide to have a monoamine end group, it is sufficient to use a chain regulator of formula

in which:

$R_1$ is hydrogen or a linear or branched alkyl group containing up to 20 carbon atoms and $R_2$ is a linear or branched alkyl or alkenyl group having up to 20 carbon atoms, a saturated or unsaturated cycloaliphatic radical, an aromatic radical or a combination of the above. The regulator can be, for example, laurylamine or oleylamine.

(C4) is advantageously a PA 6, a PA 11 or a PA 12. The proportion of C4 in C3+C4 by weight is advantageously between 0.1 and 60%. The reaction of (C3) with (C4) takes place preferably in the melt state. It is possible, for example, to knead (C3) and (C4) in an extruder at a temperature which is generally between 230 and 250° C. The average residence time of the melt in the extruder may be between 10 seconds and 3 minutes and, preferably, between 1 and 2 minutes.

As far as the third embodiment is concerned, the proportions are advantageously the following (by weight):

60 to 70% of polyamide,
5 to 15% of an ethylene-alkyl (meth)acrylate-maleic anhydride copolymer,
the remainder is a polyethylene of the EVA, ethylene-alkyl (meth)acrylate, LLDPE, VLDPE or metallocene type; advantageously, the density of the LLDPE, VLDPE or metallocene polyethylene is between 0.870 and 0.925, and the MFI is between 0.1 and 5 (190° C.-2.16 kg).

The ethylene-alkyl (meth)acrylate-maleic anhydride copolymers advantageously contain from 0.2 to 10% by weight of maleic anhydride and up to 40% and, preferably, from 5 to 40% of alkyl (meth)acrylate. Their MFI is between 2 and 100 (190° C.-2.16 kg). The alkyl (meth)acrylates have already been described above. The melting point is between 80 and 120° C. These copolymers are commercially available. They are produced by radical polymerization at a pressure which may be between 200 and 2 500 bars.

As far as the fourth embodiment is concerned, the proportions are advantageously the following (by weight):
30 to 95% of polyamide,
70 to 5% of blend of an ethylene-alkyl (meth)acrylate-maleic anhydride copolymer and of an ethylene-alkyl (meth)acrylate-glycidyl methacrylate copolymer.

The ethylene-alkyl (meth)acrylate-maleic anhydride copolymers advantageously contain from 0.2 to 10% by weight of maleic anhydride and up to 40% and, preferably, from 5 to 40% of alkyl (meth)acrylate. Their MFI is between 2 and 100 (190° C.-2.16 kg). The alkyl (meth)acrylates have already been described above. The melting point is between 80 and 120° C. These copolymers are commercially available. They are produced by radical polymerization at a pressure which may be between 200 and 2 500 bars.

The ethylene/alkyl (meth)acrylate/glycidyl methacrylate copolymer may contain up to 40% by weight of alkyl (meth)acrylate, advantageously from 5 to 40% and up to 20% by weight of unsaturated epoxide, preferably 0.1 to 12%.

Advantageously, the alkyl (meth)acrylate is chosen from methyl (meth)acrylate, ethyl acrylate, n-butyl acrylate, isobutyl acrylate, 2-ethylhexyl acrylate. The quantity of alkyl (meth)acrylate is preferably from 20 to 35%. The MFI is advantageously between 5 and 100 (in g/10 min at 190° C. under 2.16 kg), the melting point is between 60 and 110° C. This copolymer may be obtained by free-radical polymerization of the monomers.

It is possible to add catalysts in order to speed up the reaction between the epoxy and anhydride functions; among the compounds capable of speeding up the reaction between the epoxy function and the anhydride function, mention may be made in particular:
- of tertiary amines such as dimethyllaurylamine, dimethylstearylamine, N-butylmorpholine, N,N-dimethylcyclohexylamine, benzyldimethylamine, pyridine, dimethylamino-4-pyridine, methyl-1-imidazole, tetramethylethylhydrazine, N,N-dimethylpiperazine, N,N,N',N'-tetramethyl-1,6-hexanediamine, a mixture of tertiary amines having from 16 to 18 carbons and known under the name dimethyltallowamine,
- tertiary phosphines such as triphenylphosphine,
- zinc alkyldithiocarbamates,
- acids,
- amino acids such as for example 11-aminoundecanoic acid, aminocaproic acid (obtained for example from the opening of caprolactam) and 12-aminododecanoic acid (obtained for example from the opening of lauryllactam).

There will be no departure from the framework of the invention if a portion of the ethylene-alkyl (meth)acrylate-maleic anhydride copolymer is replaced with an ethylene-acrylic acid copolymer or an ethylene-maleic anhydride copolymer, the maleic anhydride having been fully or partially hydrolysed. These copolymers may also comprise an alkyl (meth)acrylate. This part may represent up to 30% of the ethylene-alkyl (meth)acrylate-maleic anhydride copolymer.

As far as the nanofillers are concerned, they designate particles of any shape, at least one of their dimensions being in the nanometre range. Advantageously, they are lamellar peelable fillers. In particular, the lamellar peelable fillers are silicates and in particular organophilic treated clays; these clays, which exist in the form of sheets, are made organophilic by intercalating organic or polymeric molecules between them, and are obtained in particular according to a process as described in patent U.S. Pat. No. 5,578,672.

Preferably, the clays used are of the smectite type, either of natural origin, such as in particular montmorillonites, bentonites, saponites, hectorites, fluorohectorites, beidellites, stibensites, nontronites, stipulgites, attapulgites, illites, vermiculites, halloysites, stevensites, zeolites, fuller's earth and mica, or of synthetic origin, such as permutites.

By way of example, mention may be made of the organophilic clays described in patent U.S. Pat. No. 6,117,932. Preferably, the clay is modified with an organic substance by ionic bonding with an onium ion having 6 carbon atoms or more. If the number of carbon atoms is less than 6, the organic onium ion is too hydrophilic and therefore the compatibility with the polymer ((A) and (B) blend) may decrease. By way of example of organic onium ion, mention may be made of hexylammonium ions, octylammonium ions, 2-ethylhexylammonium ions, dodecylammonium ions, laurylammonium ions, octadecylammonium (stearylammonium) ions, dioctyldimethylammonium ions, trioctylammonium ions, distearyldimethylammonium ions, stearyltrimethylammonium ions and ammonium laurate ions. It is recommended to use a clay having the highest possible surface of contact with the polymer. The higher the contact surface, the greater the separation of the clay lamellae. The cationic exchange capacity of the clay is preferably between 50 and 200 milliequivalents per 100 g. If the capacity is less than 50, the exchange of the onium ions is insufficient and the separation of the clay lamellae may be difficult. By contrast, if the capacity is greater than 200, the strength of bonding between the clay lamellae is so strong that the separation of the lamellae may be difficult. By way of example of clay, mention may be made of smectite, montmorillonite, saponite, hectorite, beidellite, stibensite, nontronite, vermiculite, halloysite and mica. These clays may be of natural or synthetic origin. The proportion of organic onium ion is advantageously between 0.3 et 3 equivalents of the ion exchange capacity of the clay. If the proportion is less than 0.3, the separation of the clay lamellae may be difficult. If the proportion is greater than 3, degradation of the polymer may occur. The proportion of organic onium ion is preferably between 0.5 and 2 equivalents of the ion exchange capacity of the clay.

As far as the proportion of nanofillers in the polyamide and polyolefin blend is concerned, it may be at any level. The higher this proportion, the better the barrier properties. Advantageously, this proportion is between 0.1 and 50 parts per respectively 100 parts of the (A) and (B) blend; and preferably between 0.5 and 10.There will be no departure from the framework of the invention on using a blend of nanofillers.

The compositions according to the invention may additionally contain at least one additive chosen from:
colorants;
pigments;
brightners;
antioxidants:

flame retardants;
UV stabilizers.

The compositions of the invention are prepared either by blending all the ingredients (A, B, nanofillers and optional additive) in the so-called "direct" process, or by adding the nanofillers and the optional additive to the already prepared A/B blend or else by blending a polyamide (A) already containing nanofillers with a polyolefin (B) or a polyamide (A) with a polyolefin (B) already containing nanofillers or any combination of these possibilities. The polyamide containing nanofillers may be obtained during, the polymerization of its monomer (or its monomers) in the presence of nanofillers or by compounding the polyamide and the nanofillers.

Use is advantageously made of the usual blending and kneading devices in the thermoplastics industry such as extruders and kneaders, for example BUSS® cokneaders.

EXAMPLES

1—case of permeability to styrene (SMC and BMC application)
Principle of the method of measurement: permeation cell coupled to a chromatographic detector allowing the mass of the permeate to be quantified.
Permeate: styrene
Temperature: 40° C.
Samples: 25 micron films obtained by tubular extrusion-blowing of film
Making 3 measurements per type of film.

Results:
The following products were used:
PA 6 B4: denotes a PA 6 possessing a relative viscosity (at 1% in sulphuric acid) of 4.
PA 6 nanocomposite: denotes Durethan KU2-2601 from Bayer® which is a PA 6 having a viscosity of 177 to 199 ml/g in accordance with ISO 307 enriched with particles of nanoclays.
Orgalloy 1: denotes a PA 6 and LLDPE blend compatibilized with an ethylene-butyl acrylate-maleic anhydride copolymer in the respective proportions 65/25/10 by weight.
Orgalloy 1 nanocomposite: denotes a PA 6 nanocomposite and LLDPE blend compatibilized with an ethylene-butyl acrylate-maleic anhydride copolymer in the respective proportions 65/25/10 by weight.
Orgalloy 2: denotes a blend of PA 6, polypropylene and a compatibilizer in the respective proportions 60/30/10 by weight. The compatibilizer is a polypropylene onto which maleic anhydride has been grafted and which was then condensed with a monoamino PA 6 having a weight-average molar mass of 2 500 g; it is described in patent U.S. Pat. No. 5,342,886.
Orgalloy 2 nanocomposite: denotes a blend of PA 6 nanocomposite, polypropylene and a compatibilizer in the respective proportions 60/30/10 by weight. The compatibilizer is a polypropylene onto which maleic anhydride has been grafted and which was then condensed with a monoamino PA 6 having a weight-average molar mass of 2 500 g, it is described in patent U.S. Pat. No. 5,342,886.
The results of the measurements of permeability to styrene are presented in Table 1.

TABLE 1

Stream of styrene measured at 40° C.

| Materials | Stream of styrene in g · mm/m$^2$ · 24 h |
|---|---|
| PA 6 B4 | 0.2 |
| PA 6 nanocomposite | 0.13 |
| Orgalloy 1 | 0.2 |
| Orgalloy 1 nanocomposite | 0.03 |
| Orgalloy 2 | 0.25 |
| Orgalloy 2 nanocomposite | 0.1 |

Intrinsically, the Orgalloy 1 and 2 nanocomposite products are more barrier producing than PA 6 nanocomposite. In particular, Orgalloy 1 nanocomposite is more than 4 times more barrier producing than the PA 6 nanocomposite.

The results are presented in Table 1 and the results are expressed in Table 2 in the form of a gain in permeability. The benefit of the coupling of the "polyamide and polyolefin blend" and "nanocomposite" technologies is visible in Table 2 which mentions the reduction of the permeability associated with the nanocomposite effect.

TABLE 2

Reduction of the permeability to styrene associated with the nanocomposite effect.

| | Reduction of permeability |
|---|---|
| Passage from PA 6 to PA 6 nanocomposite | 35% |
| Passage from Orgalloy 1 to Orgalloy 1 nanocomposite | 85% |
| Passage from Orgalloy 2 to Orgalloy 2 nanocomposite | 60% |

The reductions of permeability are much higher (factor of 2 to 3) in the case of the coupling of the "polyamide and polyolefin blend" and "nanocomposite" technologies compared with the case of the nanocomposite alone (passage from PA 6 to PA 6 nanocomposite).

What is claimed is:

1. A composition having barrier properties comprising a blend of Polyamide (A) and polyolefin (B) wherein said blend contains nanofillers, wherein said polyamide forms the matrix, and wherein said polyolefin (B) is selected from the group consisting of an ethylene vinyl acetate (EVA) copolymer containing up to 40 percent by weight of vinyl acetate, linear low density polyethylene (LLDPE), very low density polyethylene (VLDPE), metallocene polyethylene, an ethylene-alkyl (meth)acrylate-maleic anhydride copolymer, and mixtures thereof.

2. The composition according to claim 1, in which the proportion of nanofillers is between 0.1 and 50 parts per respectively 100 parts of(A) and (B) blend.

3. An article comprising at least one layer consisting of the composition of claim 1, and optionally at least one layer of another material 4. The article of claim 3 wherein said article comprises a bottle, reservoir, container, pipe, or vessel.

5. The article of claim 3 wherein said article comprises a film.

* * * * *